UNITED STATES PATENT OFFICE.

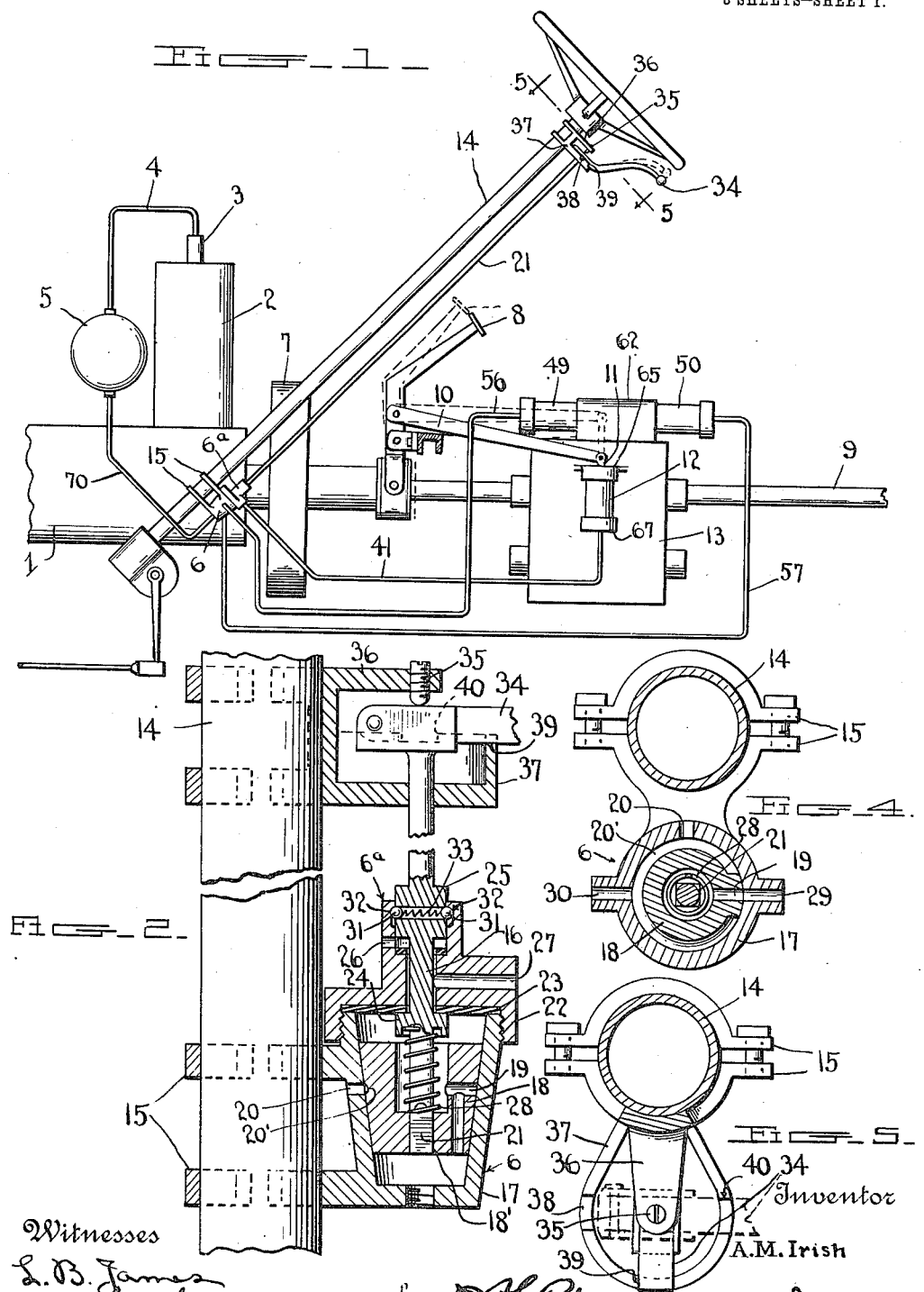

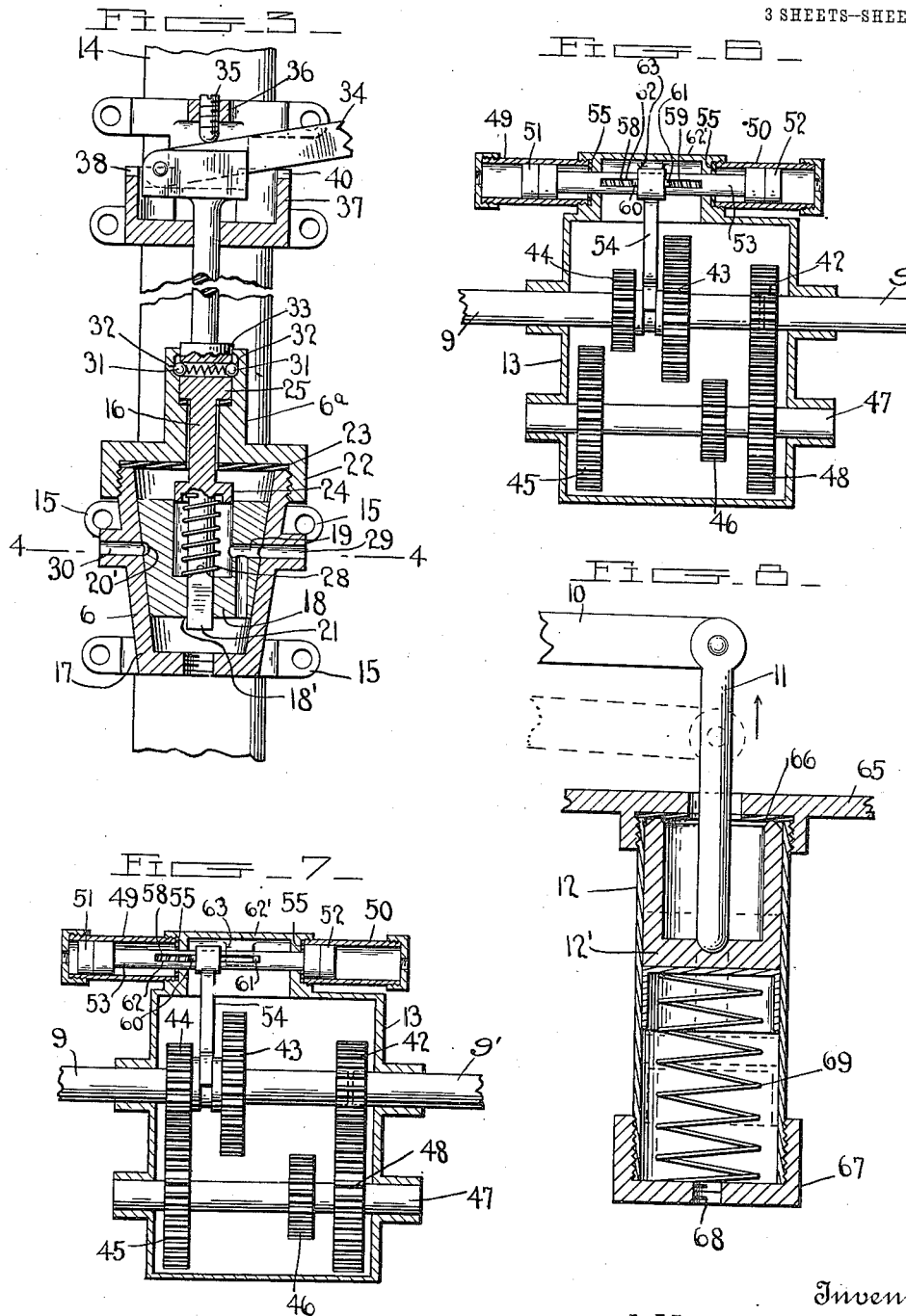

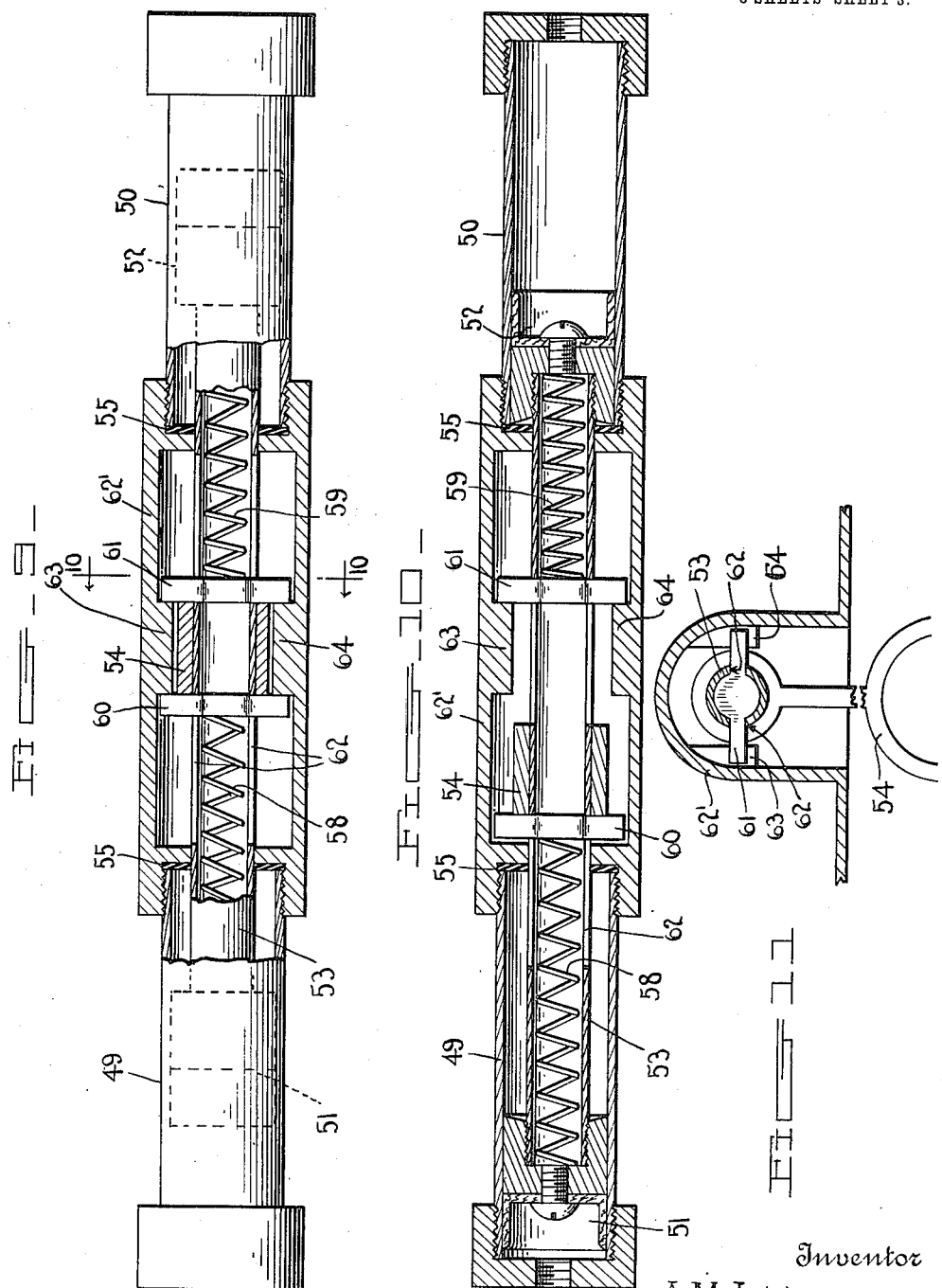

ALLEN M. IRISH, OF BATH, MAINE.

GEAR-CHANGING DEVICE.

1,010,054.   Specification of Letters Patent.   Patented Nov. 28, 1911.

Application filed December 15, 1910. Serial No. 597,399.

*To all whom it may concern:*

Be it known that I, ALLEN M. IRISH, a citizen of the United States, residing at Bath, in the county of Sagadahoc and State of Maine, have invented certain new and useful Improvements in Gear-Changing Devices; and I do declare the following to be a full, clear, and exact description of the invention, such as will enable others skilled in the art to which it appertains to make and use the same.

This invention relates to an improved clutch shifting and gear changing device.

The object of the invention is to provide a simply constructed and efficient device of this character in which the clutch control and the gear shifter are conjoined to cause the clutch valve to open and release the clutch before a gear change is possible.

With these and other objects in view, the invention consists of certain novel features of construction, combination and arrangement of parts as will be more fully described and particularly pointed out in the appended claims.

In the accompanying drawings:—Figure 1 represents a diagrammatic view showing the application of this invention; Fig. 2 is a transverse vertical section through the valve with parts broken out and with the valve shown in neutral position which it assumes when the clutch is engaged; Fig. 3 is a similar view with the valve shown in active position and the clutch disengaged; Fig. 4 is a horizontal sectional view taken on the line 4—4 of Fig. 3; Fig. 5 is a similar view taken on the line 5—5 of Fig. 1; Fig. 6 is a vertical sectional view through the gear casing showing the gear shifter in neutral position; Fig. 7 is a similar view with the gear shifter shown in active position and the gears in mesh; Fig. 8 is a vertical sectional view of the clutch operating cylinder; Fig. 9 is a side elevation partly in section of the gear shifting cylinder with parts shown in the position indicated in Fig. 6; Fig. 10 is a longitudinal vertical section of the cylinder with the parts shown in the position indicated by Fig. 7; Fig. 11 is a transverse section through the cylinder.

In the embodiment illustrated, an engine 1 is shown having a cylinder 2 arranged thereon and provided with a check valve 3 which after an explosion occurs permits the pressure fluid to travel through a pipe 4 connected with said valve to an accumulator 5 where the pressure is stored and controlled by valves 6 and 6ª. A clutch 7 is connected to be operated by a clutch lever 8 mounted on a propeller shaft 9 as shown in Fig. 1. A lever 10 is connected at one end to the lever 8 and at its other end to a piston rod 11 which operates in a cylinder 12, mounted on a gear transmission case 13.

The valves 6 and 6ª are preferably constructed as shown in Figs. 2 and 3 and are mounted in suitable casings preferably secured to the steering column 14 by brackets 15. These valves 6 and 6ª are preferably in the form of a balanced plug cock controlling the pressure to the clutch and gear shifter plungers and are so constructed as to render a gear change impossible without first releasing the clutch. The valve 6 comprises a valve plug 18 mounted in a casing 17 and provided with a supply port 19 for supplying fluid to the gear shifter and with an exhaust port 20 and groove 20', (see Fig. 4.) A spindle 21 extends loosely through the valve plug 18 and is provided with an angular end which fits when lowered with an angular socket 18' in said plug whereby the plug may be turned with the spindle when in this position. The casing 17 is provided with a cap 22 having a gasket 23 arranged between it and the upper end of the casing to form a tight connection therefor and for the clutch supply valve 24 formed on the spindle 21 and mounted in the upper end of the casing 17. This valve 24 forms one member of the clutch control 6ª and the other member is in the form of a clutch exhaust valve 25 arranged in a chamber formed in the upper end of said cap 22 said chamber being provided with an exhaust port 26 and a clutch supply port 27. The valves 24 and 25 of the clutch control are connected by a stem 16, (see Fig. 2.) A valve seating spring 28 is mounted on the lower end of the spindle 21 below the valve 24. This valve casing 17 is also provided with gear shifter supply ports 29 and 30, (see Fig. 3.) Positioning balls 31 are arranged in recesses 32 and are preferably provided with a spring 33 for holding them in operative yielding position. The spindle or operating rod 21 extends into position adjacent the steering wheel and is provided at its upper end with a pivoted operating lever 34 which is fulcrumed on an adjustable pivot screw 35 which extends vertically through a laterally extending bracket 36 secured to the upper end of the steering post 14. A substantially annular member 37 projects laterally from the steering post and is provided in its upper edge with a plurality of notches, as 38, 39 and 40, which are adapted to receive the lever 34 which is connected with the upper end of the rod 21 and is operable to control the valves 6 and 6ª as hereinafter described. When the valve 6ª is manipulated to cause pressure from the accumulator 5 to be transmitted to the cylinder 12, by means of a pipe 41, the piston 12′ thereof will move outwardly in the direction of the arrow thereby operating the levers 10 and 8 and releasing the clutch 7.

The propeller shaft 9 extends into the gear casing 13 and is provided within said casing with two sliding gears 43 and 44 which are adapted to mesh with gears 45 and 46 fixed to a jack shaft 47 also mounted within said casing 13, and the inner end of said propeller shaft 9 extends into a gear 42 fixed to the inner end of a driving shaft 9′. A gear 48 is also fixed to said shaft 47 and permanently meshes with the gear 42 carried by the driving shaft.

Two cylinders 49 and 50 are mounted at diametrically opposite points above the casing 13 and are adapted to receive pistons 51 and 52 mounted on the opposite ends of a hollow piston rod 53. A shifting arm 54 is also secured to the rod 53 and is connected with the gears 43 and 44 which are slidably mounted on the propeller shaft 9. The cylinders 49 and 50 are closed at both ends and are preferably provided with gaskets, as 55. Pipes 56 and 57 are connected at one end with the ports 29 and 30 of the valve 6 and at their other ends with openings at the outer ends of the cylinders 49 and 50 through which the actuating fluid for the pistons is conducted. Coiled springs 58 and 59 are mounted in the hollow plunger rod 53 and are held in position by retaining plates 60 and 61 which pass through slots, as 62, formed in said rod to provide for the sliding of the rod relatively to said plates for a purpose hereinafter described.

The cylinders 49 and 50 are preferably mounted in opposite ends of a centrally disposed cylinder 62′ which is provided on its inner face with longitudinally spaced annular shoulders 63 and 64 against which the spring retaining plates 60 and 61 are adapted to abut to limit their inward movement. These springs 58 and 59 hold the gears in neutral position, as shown in Fig. 6, and are always under tension even when so disposed whereby a positive action is always produced thereby. Any inequality of tension of these springs will not alter the neutral position of the gears as the spring retainers 60 and 61 will bear against the shoulders 63 and 64 which limit their inward movement.

The clutch operating cylinder 12 shown in detail in Fig. 8 preferably comprises a supporting frame 65 with the cylinder 12 depending therefrom and having a gasket 66 arranged between the lower face of the frame 65 and the upper edge of the cylinder. A cap 67 is preferably secured on the lower end of the cylinder 12 and is provided with a centrally disposed aperture 68 with which the pipe 41 is designed to be connected for supplying the operating fluid to said cylinder. A follower spring 69 is preferably arranged in the cylinder 12 below the piston 12′ and is of sufficient strength only to hold the piston in operative position in engagement with the plunger rod 11, the connection between said rod and the piston being preferably in the form of a ball and socket joint, the weight of the piston 12′, the rod 11 and lever 10 being sufficient to compress spring 69 and move the piston down into dotted line inoperative position.

In the operation of this improved apparatus with the parts shown in the position indicated in Fig. 2, the compressed fluid enters the lower end of the valve 6 through a pipe 70 connected with the accumulator 5 and no action is produced thereby as the valve plug 18 is turned to cut off communication with the pipes 56 and 57, and the valve and the clutch valve 24 being also closed no pressure reaches the clutch supply port 27. The outer end of the controlling lever 34 is then raised, pivoting about the adjusting screw 35 as a fulcrum and forces the rod 21 downward which unseats the clutch supply valve 24 and seats the clutch exhaust valve 25 whereby the pressure fluid enters the clutch supply port 27 and is transmitted through the pipe 41 to the cylinder 12 and raises the piston 12′ therein, and operates the clutch lever 8 thereby disengaging the clutch. The clutch being now disengaged, the operating lever 34 which has been raised out of the notch 39 is free to be rotated from the notch 39 to the notch 40, as shown by dotted lines in Fig. 5. This turning of the lever 34, turns the valve plug 18 into position to cause the supply port 19 to register with the gear shifting port 29 and the pressure fluid is conducted through the pipe 57 to the cylinder 50 of the gear shifter and forces the piston 52 inward as shown in Fig. 7, whereby the gears 44 and 45 are caused to mesh, motion being imparted to the gear 44 by means of the arm 54 which is operated by the plunger rod 53. These gears 44 and 45 being now in mesh the operating lever 34 may be lowered into the notch 40 thereby raising the rod 21 which permits the valve 24 to seat, as shown in Fig. 2, and the valve 25 to open permitting the pressure in the clutch cylinder 12 to escape through the exhaust port 26 thereby allowing the clutch plunger to return to normal position and the clutch to become operative.

The balls shown in Figs. 2 and 3 are designed to determine the position of the handle or lever 34 when said lever is rotated to bring it in position directly over any one of the notches 38, 39 or 40.

Should it be desired to throw the gears 43 and 46 into mesh, pressure would be admitted to the cylinder 51 through the pipe 56 controlled by the valve 6 and the operation would be the same as that described above.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

I claim as my invention:—

1. In a combined clutch and gear shifter, the combination of gear shifting means, means for supplying an operating fluid to said shifting means, a valve for controlling the fluid supplied to said gear shifting means, a clutch, fluid operating means for releasing said clutch, a valve for controlling the supply of fluid to said clutch releasing means, and means connected with said valves for releasing the clutch before a gear change can be made.

2. In a combined clutch and gear shifter, the combination of gear shifting means, a valve for controlling said gear shifting means, means connecting said gear shifting means with said valve, a clutch, a valve for controlling the actuation of said clutch, means for connecting said clutch with said valve, a shaft connected with said clutch and gear shifting valves, and means connected with said shaft operable to actuate said clutch releasing means and release said clutch before a gear change is possible.

3. In a combined clutch and gear shifter, the combination of gear shifting means, a valve for controlling said gear shifting means, pipes connecting said valve and gear shifting means, a clutch, clutch actuating means, a valve for controlling the actuation of said clutch, a pipe connecting said clutch controlling valve and said clutch actuating means, means connecting said clutch and valve, a shaft connected with said clutch and gear shifting valves, an annular member surrounding said shaft and having a plurality of recesses in its upper face, and a lever connected with said shaft and extending laterally over said annular member in position to engage the recesses in said member and operable when lifted out of one of said recesses to open the clutch controlling valve to release the clutch before the shifting of the gear.

4. In a combined clutch and gear shifter, the combination of gear shifting means, a clutch, a balanced plug valve for releasing said clutch before said gear shifting means can be operated and pipes connecting said gear shifting means and said clutch with said valve.

5. In a combined clutch and gear shifter, the combination of gear shifting means, a clutch, a balanced plug valve for releasing said clutch before said gear shifting means can be operated, pipes connecting said gear shifting means and said clutch with said valve and means under the control of the operator for actuating said valve.

6. In a combined clutch and gear shifter, the combination of gear shifting means, a valve for controlling said gear shifting means, pipes connecting said valve and gear shifting means, a clutch, clutch actuating means, a valve for controlling the actuation of said clutch, a pipe connecting said clutch controlling valve and said clutch actuating means, a shaft connected with said clutch and gear shifting valves, and means connected with said shaft to actuate the clutch controlling valve before the gear shifting valve can be operated.

7. In a gear shifter, the combination of a pressure fluid reservoir, a valve connected with and adapted to control the outlet of said pressure fluid, a gear casing, stationary and slidable gears therein arranged for intermeshing engagement, a cylinder, a piston operable in said cylinder for throwing said gears into and out of mesh, a pipe connecting said valve with said cylinder, a piston rod connected with said piston, a coiled spring bearing at one end on the inner face of the piston, a spring retainer for engaging the other end of said spring, and means for limiting the movement of said retainer in one direction.

In testimony whereof I have hereunto set my hand in presence of two subscribing witnesses.

ALLEN M. IRISH.

Witnesses:
 GEO. M. STEPHENS,
 GEORGE B. MOODY.